(12) United States Patent
Signell et al.

(10) Patent No.: US 12,111,169 B2
(45) Date of Patent: Oct. 8, 2024

(54) METHOD AND SYSTEM FOR CONTEXT BASED NAVIGATION SYSTEM INTERACTION

(71) Applicant: Volvo Car Corporation, Gothenburg (SE)

(72) Inventors: Klas Roland Persson Signell, Gothenburg (SE); Egoi Sanchez Basualdo, Gothenburg (SE); Konstantinos Chatziioannou, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/974,584

(22) Filed: Oct. 27, 2022

(65) Prior Publication Data

US 2024/0142250 A1 May 2, 2024

(51) Int. Cl.
G05D 1/00 (2024.01)
G01C 21/34 (2006.01)
G05B 13/02 (2006.01)

(52) U.S. Cl.
CPC ..... *G01C 21/3484* (2013.01); *G05B 13/0265* (2013.01)

(58) Field of Classification Search
CPC .................................................. G01C 21/3484
See application file for complete search history.

(56) References Cited

U.S. PATENT DOCUMENTS 5,274,387 A * 12/1993 Kakihara ............. G01C 21/367
701/428
10,824,704 B2 * 11/2020 Weller .................... G06V 40/10
11,407,269 B2 * 8/2022 Guest ................. B60G 17/0165

FOREIGN PATENT DOCUMENTS

JP 2004164288 A * 6/2004

OTHER PUBLICATIONS

YouTube video clip entitled "Support: Finding, Saving & Deleting Addresses on an Automotive Device," 1 page, uploaded on Feb. 24, 2020 by user "Garmin" [retrieved on Jan. 22, 2024]. Retrieved from the Internet: <https://www.youtube.com/watch?v=TvQDvQqaUEo>. (Year: 2020).*

* cited by examiner

*Primary Examiner* — Redhwan K Mawari
*Assistant Examiner* — Paul W Arellano
(74) *Attorney, Agent, or Firm* — Clements Bernard Walker; Christopher L. Bernard; Devin Cummins

(57) ABSTRACT

The navigation system of the present disclosure is configured to receive a short command from a vehicle occupant and extrapolate relevant details associated with the command using an artificial intelligence (AI)/machine learning (ML) algorithm. These relevant details may be obtained from a mobile device associated with the occupant and in communication with the navigation system, an external database in communication with the navigation system, etc. Communication links may be wired, wireless through the cloud, near field, etc. Further, each occupant's identity may be determined via near field key fob recognition, microphone voice recognition, camera facial recognition, or via the detection of the mobile device associated with the occupant. Levels of complexity may be added, with multiple occupants being identified and issuing different commands, multiple external information sources subsequently being consulted, and multiple sub-routes to multiple destinations being planned and followed.

20 Claims, 8 Drawing Sheets

METHOD AND SYSTEM FOR CONTEXT BASED NAVIGATION SYSTEM INTERACTION

TECHNICAL FIELD

The present disclosure relates generally to the automotive and navigation fields. More particularly, the present disclosure relates to a method and system for context based navigation system interaction.

BACKGROUND

As vehicle occupants become busier and technology improves, the occupants want minimal interaction with the various devices and systems of the vehicle in order to achieve their goals and prefer machines to do the work. For example, when a vehicle occupant uses the navigation system of a vehicle, they must enter a destination address or location, enter a waypoint address or location, etc., requiring a great deal of interaction with the navigation system.

Further, the navigation system is typically unaware of the identity of a given occupant and assumes that all queries and commands should be treated similarly, in an occupant agnostic manner. One input is the same as another input.

This background is provided as illustrative environmental context only and is not intended to be limiting in any manner. It will be readily apparent to those of ordinary skill in the art that the concepts and principles of the present disclosure may be implemented in other environmental contexts equally.

SUMMARY

The present disclosure provides a method and system for context based navigation system interaction. The navigation system of the present disclosure is configured to receive a short command from a vehicle occupant and extrapolate relevant details associated with the command using an artificial intelligence (AI)/machine learning (ML) algorithm. These relevant details may be obtained from a mobile device associated with the occupant and in communication with the navigation system, an external database in communication with the navigation system, etc. Communication links may be wired, wireless through the cloud, near field, etc. Thus, for example, a command such as "I want to go to work for my afternoon meeting" is processed to identify and retrieve the occupant's workplace and work location address from the occupant's mobile device, check the occupant's calendar on the occupant's mobile device to determine when the afternoon meeting actually is, select a fastest route or route that best fits any stated desired arrival time, and select a best route based on factors such as traffic, remaining fuel/charge, fuel/charging station locations, road conditions, weather, etc.

Further, each occupant's identity may be determined via near field key fob recognition, microphone voice recognition, camera facial recognition, or via the detection of the mobile device associated with the occupant. Thus, for example, a command such as "we want to go to work for our afternoon meeting" is processed to identify and retrieve the occupants' workplace and work location address from the occupants' mobile devices, check the occupants' calendars on the occupants' mobile devices to determine if the afternoon meeting is the same for each of the occupants and when the afternoon meeting actually is, select a fastest route or route that best fits any stated desired arrival time, and select a best route based on factors such as traffic, remaining fuel/charge, fuel/charging station locations, road conditions, weather, etc. Thus, the navigation system utilizes communication links with multiple identified external information sources. Further, the navigation system may query an external map or parking spot database to fine tune the route and locate a parking spot that takes the occupants to an ultimate destination that is as close as possible to their goal. It will be readily apparent to those of ordinary skill in the art that levels of complexity may be added, with multiple occupants being identified and issuing different commands, multiple external information sources subsequently being consulted, and multiple sub-routes to multiple destinations being planned and followed.

In one illustrative embodiment, the present disclosure provides a method, including: at a navigation system disposed in a vehicle, receiving a command from an occupant of the vehicle; using an artificial intelligence (AI)/machine learning (ML) system associated with the navigation system, parsing the command using contextual information obtained from a mobile device of the occupant or an external database in communication with the AI/ML system to generate an executable command; and, at the navigation system, receiving the executable command, generating a corresponding output, and providing the output to the occupant. The method further includes identifying the occupant via near field key fob recognition, microphone voice recognition, camera facial recognition, or via detection of the mobile device. The method still further includes, at an electronic control unit (ECU) disposed in the vehicle, receiving the executable command and operating the vehicle in accordance with the executable command. The command includes a verbal command or a written command. The mobile device of the occupant or the external database is in communication with the AI/ML system via a communication link that is wired, wireless through a cloud network, or near field. In one embodiment, the command includes insufficient information for the navigation system to determine a proposed navigation route, the executable command includes sufficient information for the navigation system to determine the proposed navigation route due to the contextual information, and the output includes the proposed navigation route provided to the occupant through a user interface display of the navigation system. The proposed navigation route is determined further based on at least one of traffic, remaining fuel/charge, fuel/charging station locations, road conditions, weather, and operational state of the vehicle. The method is carried out via a non-transitory computer-readable medium including instructions stored in a memory and executed by a processor to carry out the various method steps.

In another illustrative embodiment, the present disclosure provides a system, including: a navigation system disposed in a vehicle operable for receiving a command from an occupant of the vehicle; an artificial intelligence (AI)/machine learning (ML) system associated with the navigation system and including a non-transitory computer-readable medium including instructions stored in a memory and executed by a processor operable for parsing the command using contextual information obtained from a mobile device of the occupant or an external database in communication with the AI/ML system to generate an executable command; and the navigation system operable for receiving the executable command, generating a corresponding output, and providing the output to the occupant. The AI/ML system is further operable for identifying the occupant via near field key fob recognition, microphone voice recognition, camera facial recognition, or via detection of the mobile device. The system further includes an electronic control unit (ECU) disposed in the vehicle operable for receiving the executable command and operating the vehicle in accordance with the executable command. The command includes a verbal command or a written command. The mobile device of the occupant or the external database is in communication with the AI/ML system via a communication link that is wired, wireless through a cloud network, or near field. In one embodiment, the command includes insufficient information for the navigation system to determine a proposed navigation route, the executable command includes sufficient information for the navigation system to determine the proposed navigation route due to the contextual information, and the output includes the proposed navigation route provided to the occupant through a user interface display of the navigation system. The proposed navigation route is determined further based on at least one of traffic, remaining fuel/charge, fuel/charging station locations, road conditions, weather, and operational state of the vehicle.

In a further illustrative embodiment, the present disclosure provides a method, including: at a navigation system disposed in a vehicle, receiving commands from a plurality of occupants of the vehicle; using an artificial intelligence (AI)/machine learning (ML) system associated with the navigation system, identifying each of the occupants via near field key fob recognition, microphone voice recognition, camera facial recognition, or via detection of mobile devices of the occupants and parsing the commands using contextual information obtained from the mobile devices or an external database in communication with the AI/ML system to generate executable commands; and, at the navigation system, receiving the executable commands, generating a corresponding output, and providing the output to the occupants. The method further includes, at an electronic control unit (ECU) disposed in the vehicle, receiving the executable commands and operating the vehicle in accordance with the executable commands. The commands include verbal commands or written commands. The mobile devices of the occupants or the external database is/are in communication with the AI/ML system via communication links that is/are wired, wireless through a cloud network, or near field. In one embodiment at least one of the commands includes insufficient information for the navigation system to determine a proposed navigation route, a corresponding executable command includes sufficient information for the navigation system to determine the proposed navigation route due to the contextual information, and a corresponding output includes the proposed navigation route provided to a corresponding occupant through a user interface display of the navigation system. The proposed navigation route is determined further based on at least one of traffic, remaining fuel/charge, fuel/charging station locations, road conditions, weather, and operational state of the vehicle. In one embodiment, the proposed navigation route is determined further based on a parking location received from a parking database and determined to be closest to the destination of the proposed navigation route. The method is carried out via a non-transitory computer-readable medium including instructions stored in a memory and executed by a processor to carry out the various method steps.

In a still further illustrative embodiment, the present disclosure provides a system, including: a navigation system disposed in a vehicle operable for receiving commands from a plurality of occupants of the vehicle; an artificial intelligence (AI)/machine learning (ML) system associated with the navigation system and including a non-transitory computer-readable medium including instructions stored in a memory and executed by a processor operable for identifying each of the occupants via near field key fob recognition, microphone voice recognition, camera facial recognition, or via detection of mobile devices of the occupants and parsing the commands using contextual information obtained from the mobile devices or an external database in communication with the AI/ML system to generate executable commands; and the navigation system operable for receiving the executable commands, generating a corresponding output, and providing the output to the occupants. The system further includes an electronic control unit (ECU) disposed in the vehicle operable for receiving the executable commands and operating the vehicle in accordance with the executable commands. The commands include verbal commands or written commands. The mobile devices of the occupants or the external database is/are in communication with the AI/ML system via communication links that is/are wired, wireless through a cloud network, or near field. In one embodiment, at least one of the commands includes insufficient information for the navigation system to determine a proposed navigation route, a corresponding executable command includes sufficient information for the navigation system to determine the proposed navigation route due to the contextual information, and a corresponding output includes the proposed navigation route provided to a corresponding occupant through a user interface display of the navigation system. The proposed navigation route is determined further based on at least one of traffic, remaining fuel/charge, fuel/charging station locations, road conditions, weather, and operational state of the vehicle. In one embodiment, the proposed navigation route is determined further based on a parking location received from a parking database and determined to be closest to the destination of the proposed navigation route.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Again, the present disclosure provides a method and system for context based navigation system interaction. The navigation system of the present disclosure is configured to receive a short command from a vehicle occupant and extrapolate relevant details associated with the command using an artificial intelligence (AI)/machine learning (ML) algorithm. These relevant details may be obtained from a mobile device associated with the occupant and in communication with the navigation system, an external database in communication with the navigation system, etc. Communication links may be wired, wireless through the cloud, near field, etc. Thus, for example, a command such as "I want to go to work for my afternoon meeting" is processed to identify and retrieve the occupant's workplace and work location address from the occupant's mobile device, check the occupant's calendar on the occupant's mobile device to determine when the afternoon meeting actually is, select a fastest route or route that best fits any stated desired arrival time, and select a best route based on factors such as traffic, remaining fuel/charge, fuel/charging station locations, road conditions, weather, etc.

Further, each occupant's identity may be determined via near field key fob recognition, microphone voice recognition, camera facial recognition, or via the detection of the mobile device associated with the occupant. Thus, for example, a command such as "we want to go to work for our afternoon meeting" is processed to identify and retrieve the occupants' workplace and work location address from the occupants' mobile devices, check the occupants' calendars on the occupants' mobile devices to determine if the afternoon meeting is the same for each of the occupants and when the afternoon meeting actually is, select a fastest route or route that best fits any stated desired arrival time, and select a best route based on factors such as traffic, remaining fuel/charge, fuel/charging station locations, road conditions, weather, etc. Thus, the navigation system utilizes communication links with multiple identified external information sources. Further, the navigation system may query an external map or parking spot database to fine tune the route and locate a parking spot that takes the occupants to an ultimate destination that is as close as possible to their goal. It will be readily apparent to those of ordinary skill in the art that levels of complexity may be added, with multiple occupants being identified and issuing different commands, multiple external information sources subsequently being consulted, and multiple sub-routes to multiple destinations being planned and followed.

Figure 1:
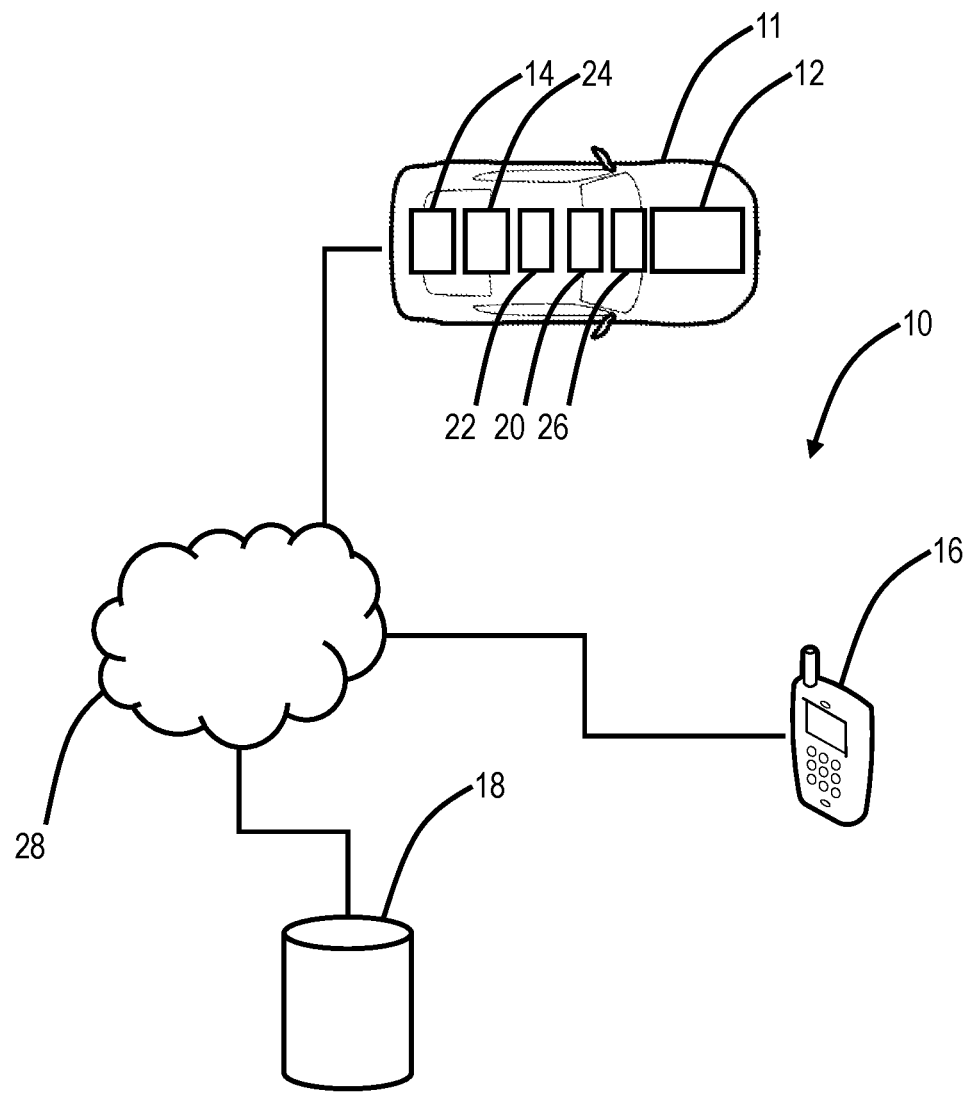
FIG. 1 is a schematic diagram illustrating one embodiment of the context based navigation system interaction system of the present disclosure.

FIG. 1 is a schematic diagram illustrating one embodiment of the context based navigation system interaction system 10 of the present disclosure. The system 10 includes a navigation system 12 disposed in a vehicle 11 operable for receiving a command from an occupant of the vehicle 11. The command is ultimately received by an artificial intelligence (AI)/machine learning (ML) system 14 associated with the navigation system 12 and including a non-transitory computer-readable medium including instructions stored in a memory and executed by a processor operable for parsing the command using contextual information obtained from a variety of external sources. As is conventional, the AI/ML system 14 is trained using annotated training datasets in a supervised on unsupervised manner. The external sources may include a mobile device 16 of the occupant or an external database 18 in communication with the AI/ML system 14. The AI/ML system 14 generates an executable command from the command using the contextual information. Thus, a simple verbal command can be contextualized and enriched with data stored on the mobile device 16, such as in the occupant's contacts, in a calendar/scheduling app, in an image gallery, etc. The simple verbal command can also be contextualized and enriched with data stored in the external database, such as in an address database, in a map database, etc. The navigation system 12 is then operable for receiving the executable command, generating a corresponding output, and providing the output to the occupant.

The AI/ML system 14 is further operable for identifying the occupant via near field key fob recognition, microphone voice recognition using a microphone 20 disposed in the vehicle 11 (which may also be used to receive the command), camera facial recognition using a camera 22 disposed in the vehicle 11, or via detection of the mobile device 16 itself.

The system 10 further includes an electronic control unit (ECU) 24 disposed in the vehicle 11 operable for receiving the executable command and operating the vehicle 11 in accordance with the executable command, with the appropriate vehicle systems ultimately executing the executable command. The command generally includes a verbal command received by the microphone 20 or a written command received by a user interface (UI)/display 26 of the navigation system 12.

The mobile device 16 of the occupant and the external database 18 are in communication with the AI/ML system 14 via communication links that are wired, wireless through a cloud network 28, or near field.

In one embodiment, the command includes insufficient information for the navigation system 12 to determine a proposed navigation route, the executable command includes sufficient information for the navigation system 12 to determine the proposed navigation route due to the contextual information, and the output includes the proposed navigation route provided to the occupant through the UI/display 26 of the navigation system 12. In such case, the proposed navigation route may further be determined based traffic, remaining fuel/charge, fuel/charging station locations, road conditions, weather, operational state of the vehicle, etc.

It will be readily apparent to those of ordinary skill in the art that any number and type of contextual information sources accessible by the vehicle may be used to parse the command to arrive at the executable command, and the executable command may be used to subsequently control any vehicle system. In this manner, simple commands may be used to control complex vehicle functions with minimal effort exerted by a vehicle occupant. In this sense, the present disclosure provides a "smart" vehicle interface that may be engaged using everyday, commonsense occupant actions.

Figure 2:
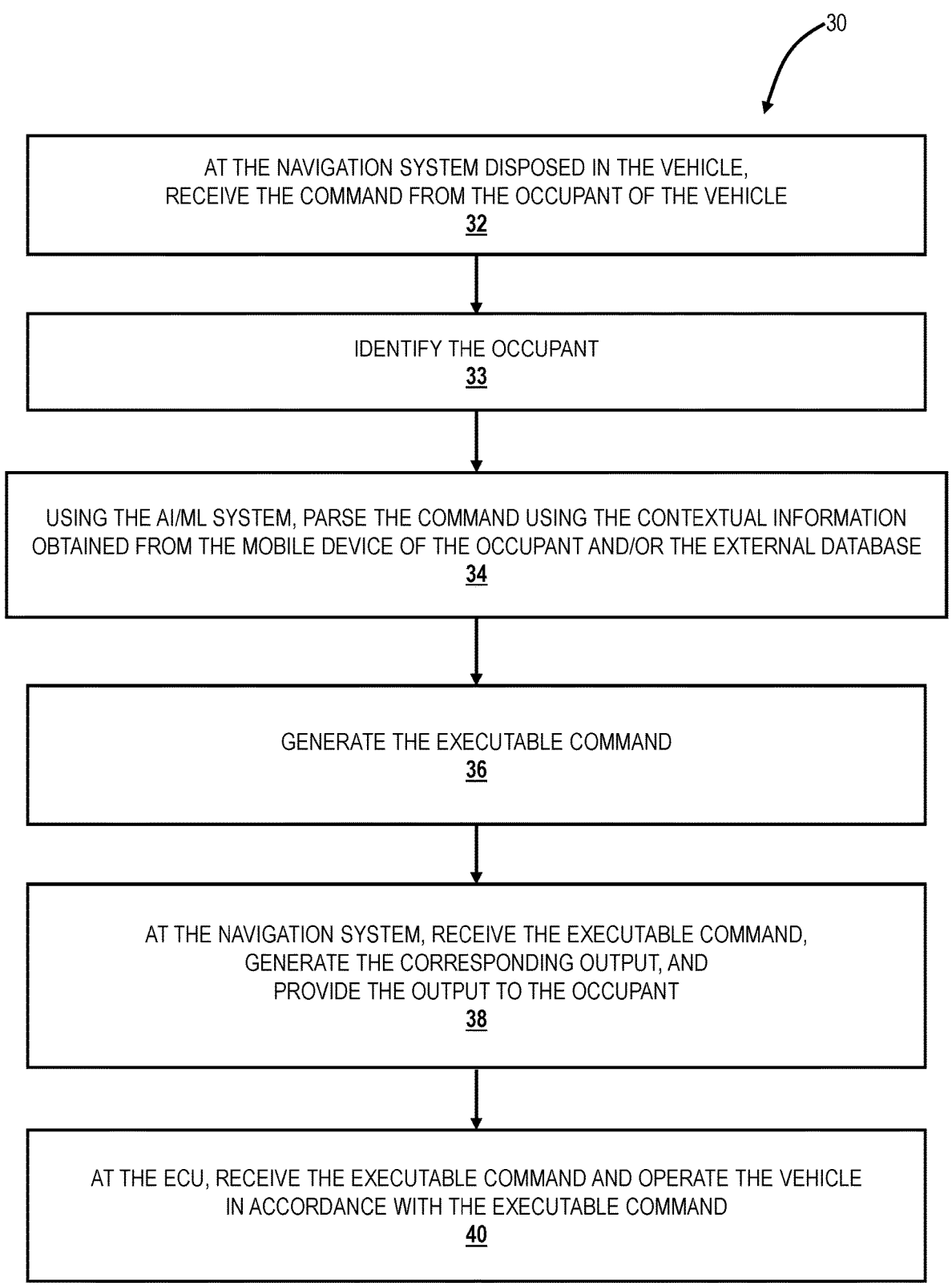
FIG. 2 is a flowchart illustrating one embodiment of the context based navigation system interaction method of the present disclosure.

FIG. 2 is a flowchart illustrating one embodiment of the context based navigation system interaction method 30 of the present disclosure. The method 30 includes, at the navigation system disposed in the vehicle, receiving the command from the occupant of the vehicle (step 32). The method 30 also includes, using the AI/ML system associated with the navigation system, parsing the command using the contextual information obtained from the mobile device of the occupant and/or the external database in communication with the AI/ML system (step 34) to generate the executable command (step 36). The method 30 further includes, at the navigation system, receiving the executable command, generating the corresponding output, and providing the output to the occupant (step 38).

The method 30 still further includes identifying the occupant via near field key fob recognition, microphone voice recognition, camera facial recognition, or via detection of the mobile device (step 33). The method 30 still further includes, at the ECU disposed in the vehicle, receiving the executable command and operating the vehicle in accordance with the executable command (step 40).

Again, the command includes a verbal command or a written command. The mobile device of the occupant or the external database is in communication with the AI/ML system via a communication link that is wired, wireless through a cloud network, or near field.

Figure 3:
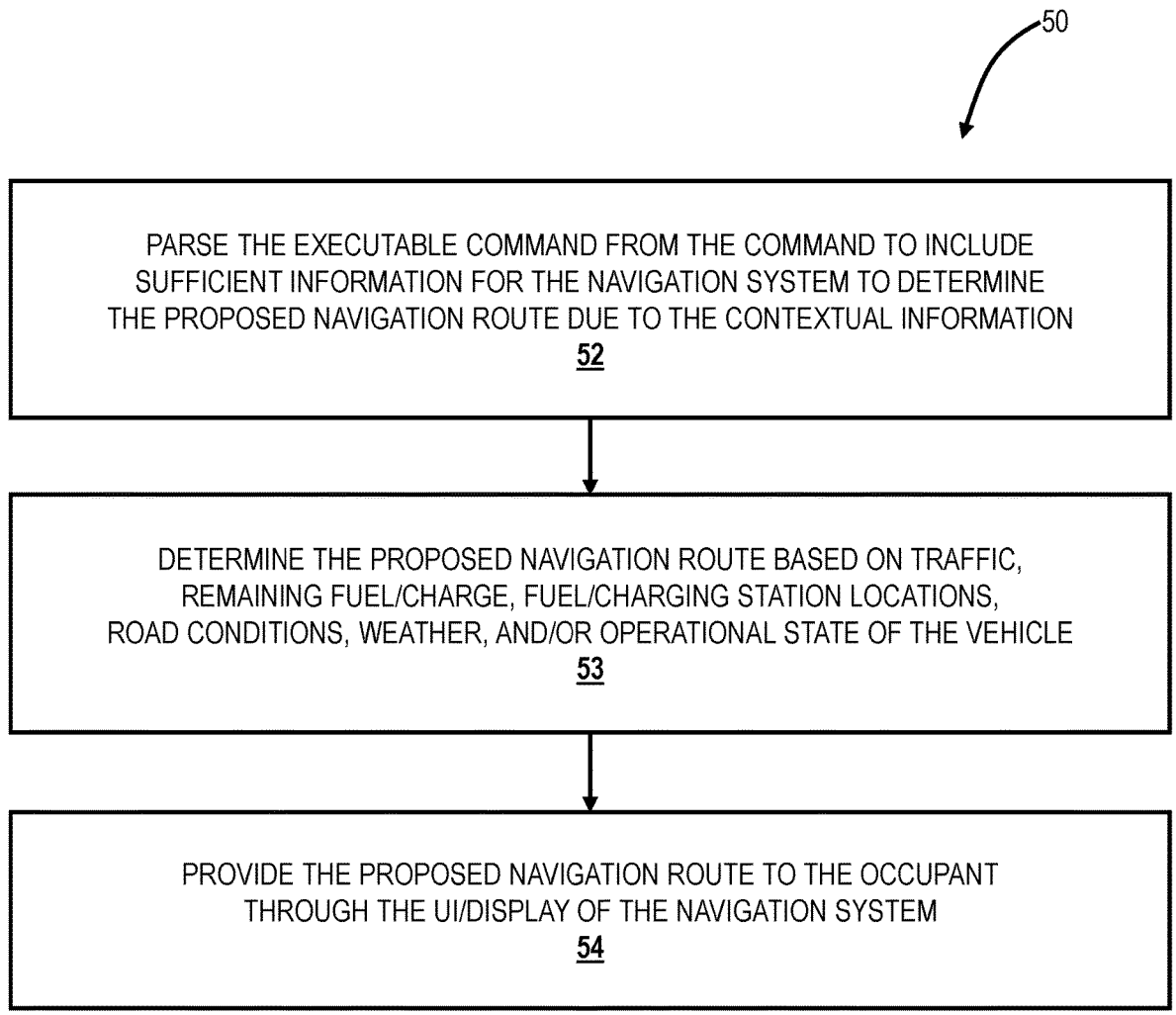
FIG. 3 is a flowchart illustrating another embodiment of the context based navigation system interaction method of the present disclosure.

FIG. 3 is a flowchart illustrating another embodiment of the context based navigation system interaction method 50 of the present disclosure. The command includes insufficient information for the navigation system to determine a proposed navigation route and the executable command is parsed from the command to include sufficient information for the navigation system to determine the proposed navigation route due to the contextual information (step 52). The output includes the proposed navigation route provided to the occupant through the UI/display of the navigation system (step 54). The proposed navigation route is determined further based on at least one of traffic, remaining fuel/charge, fuel/charging station locations, road conditions, weather, and operational state of the vehicle (step 53). The method 50 is carried out via a non-transitory computer-readable medium including instructions stored in a memory and executed by a processor to carry out the various method steps.

Figure 4:
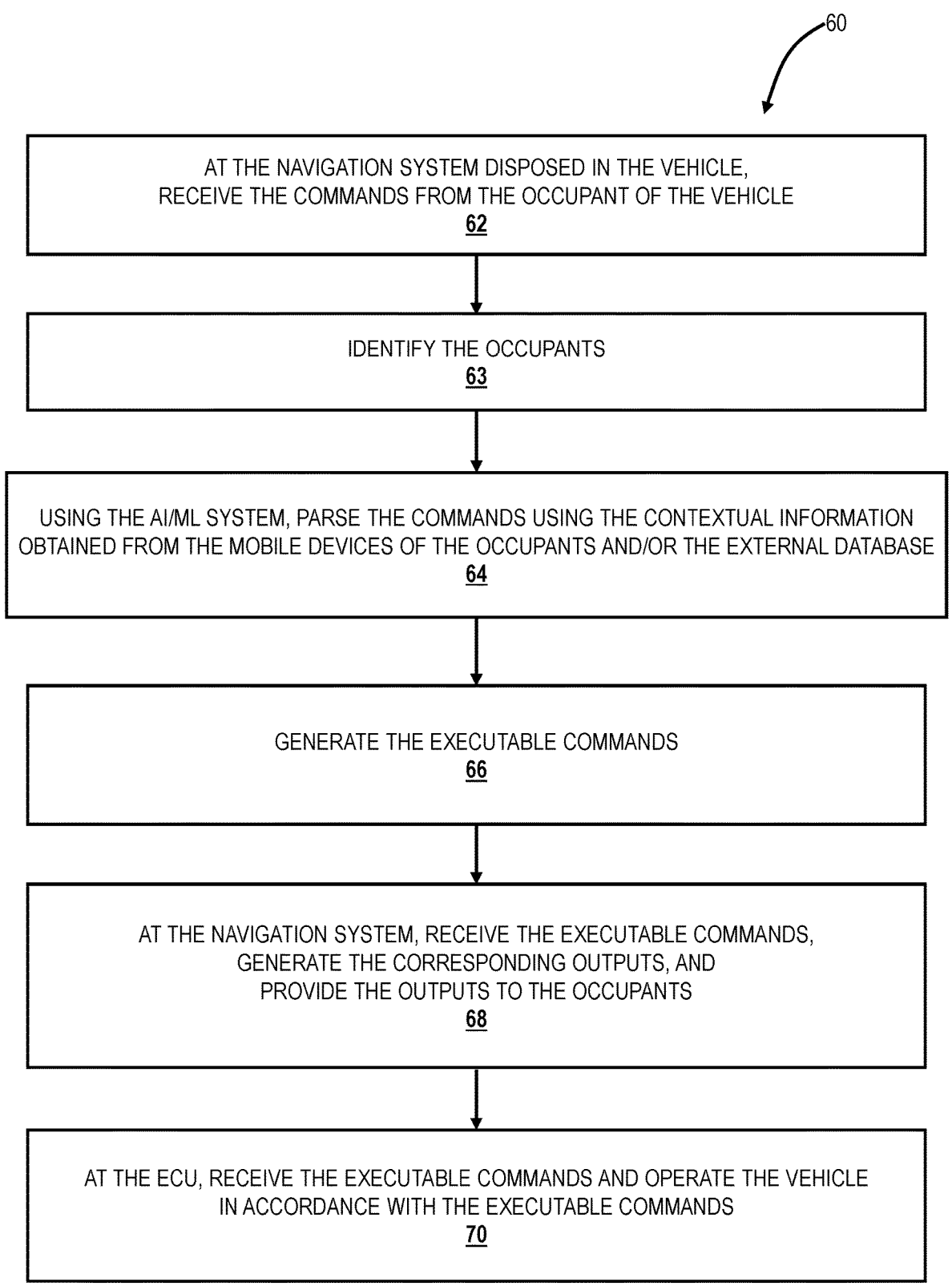
FIG. 4 is a flowchart illustrating a further embodiment of the context based navigation system interaction method of the present disclosure.

FIG. 4 is a flowchart illustrating a further embodiment of the context based navigation system interaction method 60 of the present disclosure. The method 60 includes, at the navigation system disposed in the vehicle, receiving the commands from the occupants of the vehicle (step 62). The method 60 also includes, using the AI/ML system associated with the navigation system, parsing the commands using the contextual information obtained from the mobile devices of the occupants and/or the external database in communication with the AI/ML system (step 64) to generate the executable commands (step 66). The method 60 further includes, at the navigation system, receiving the executable commands, generating the corresponding outputs, and providing the outputs to the occupants (step 68).

The method 60 still further includes identifying the occupants via near field key fob recognition, microphone voice recognition, camera facial recognition, or via detection of the mobile devices (step 63). The method 60 still further includes, at the ECU disposed in the vehicle, receiving the executable commands and operating the vehicle in accordance with the executable commands (step 70).

Again, the commands include a verbal command or a written command. The mobile devices of the occupants or the external database are in communication with the AI/ML, system via communication links that are wired, wireless through a cloud network, or near field.

Figure 5:
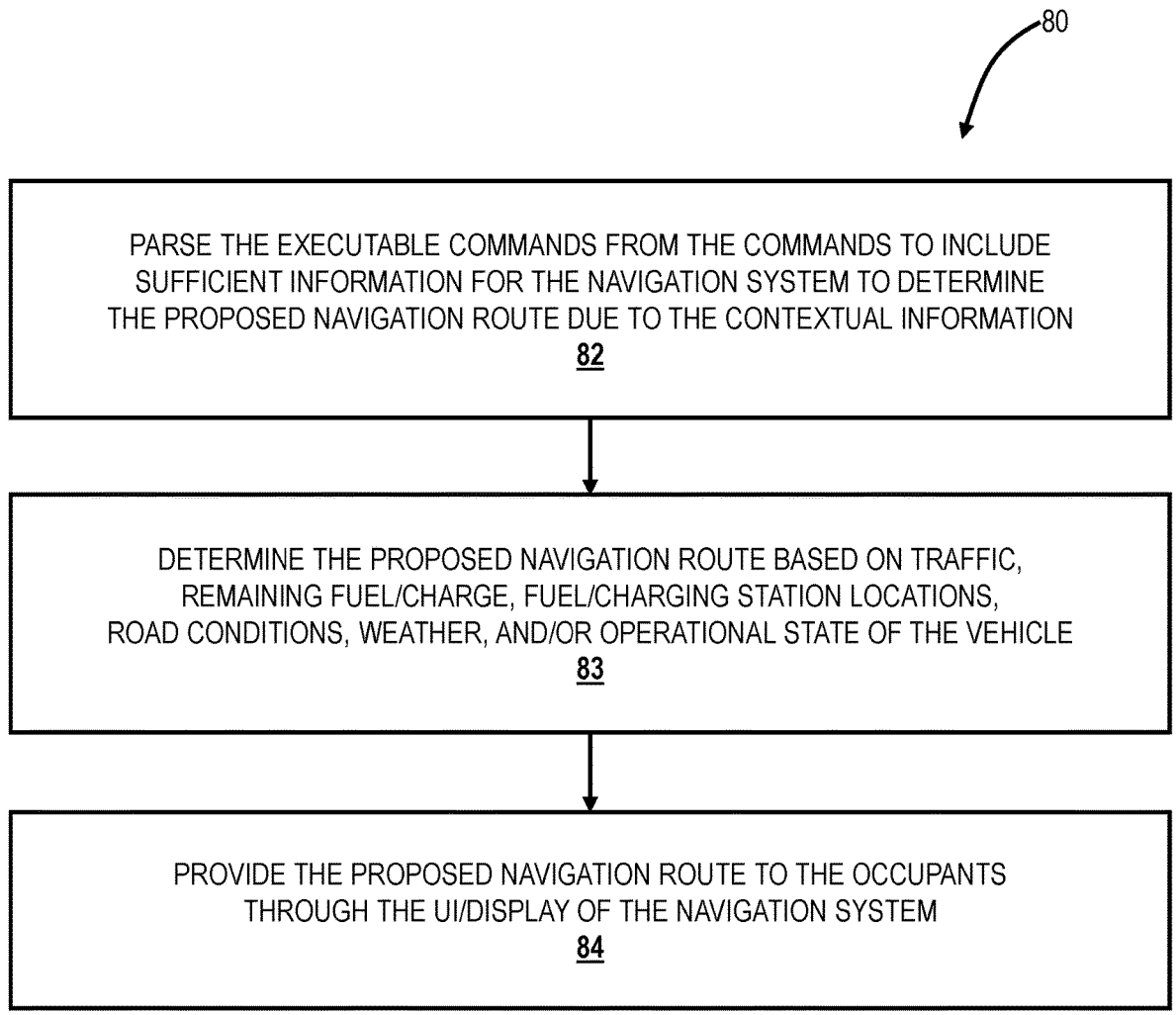
FIG. 5 is a flowchart illustrating a still further embodiment of the context based navigation system interaction method of the present disclosure.

FIG. 5 is a flowchart illustrating a still further embodiment of the context based navigation system interaction method 80 of the present disclosure. The commands include insufficient information for the navigation system to determine a proposed navigation route and the executable commands are parsed from the commands to include sufficient information for the navigation system to determine the proposed navigation route due to the contextual information (step 82). The output includes the proposed navigation route provided to the occupants through the UI/display of the navigation system (step 84). The proposed navigation route is determined further based on at least one of traffic, remaining fuel/charge, fuel/charging station locations, road conditions, weather, and operational state of the vehicle (step 83). In this manner, multiple commands can be received and parsed using individualized and common contextual information to generate one or more executable commands and outputs, such as a unified proposed navigation route that takes into account and assimilates the various commands from the various occupants. This proposed route meets the needs of all occupants, and considers traffic, remaining fuel/charge, fuel/charging station locations, road conditions, weather, operational state of the vehicle, etc., without limitation. The method 80 is carried out via a non-transitory computer-readable medium including instructions stored in a memory and executed by a processor to carry out the various method steps.

Figure 6:
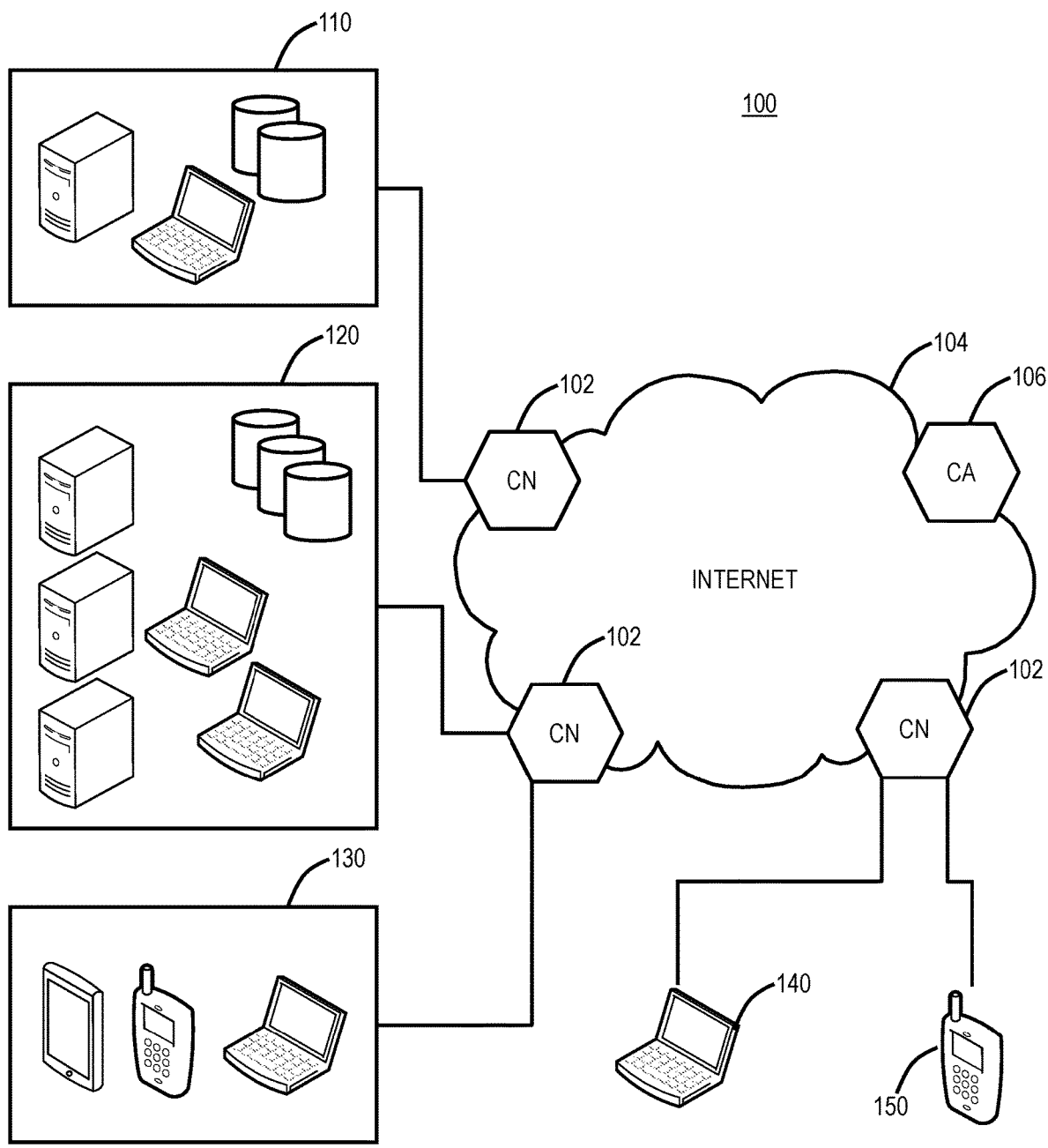
FIG. 6 is a network diagram of a cloud-based system for implementing the various algorithms and services of the present disclosure.
Figure 7:
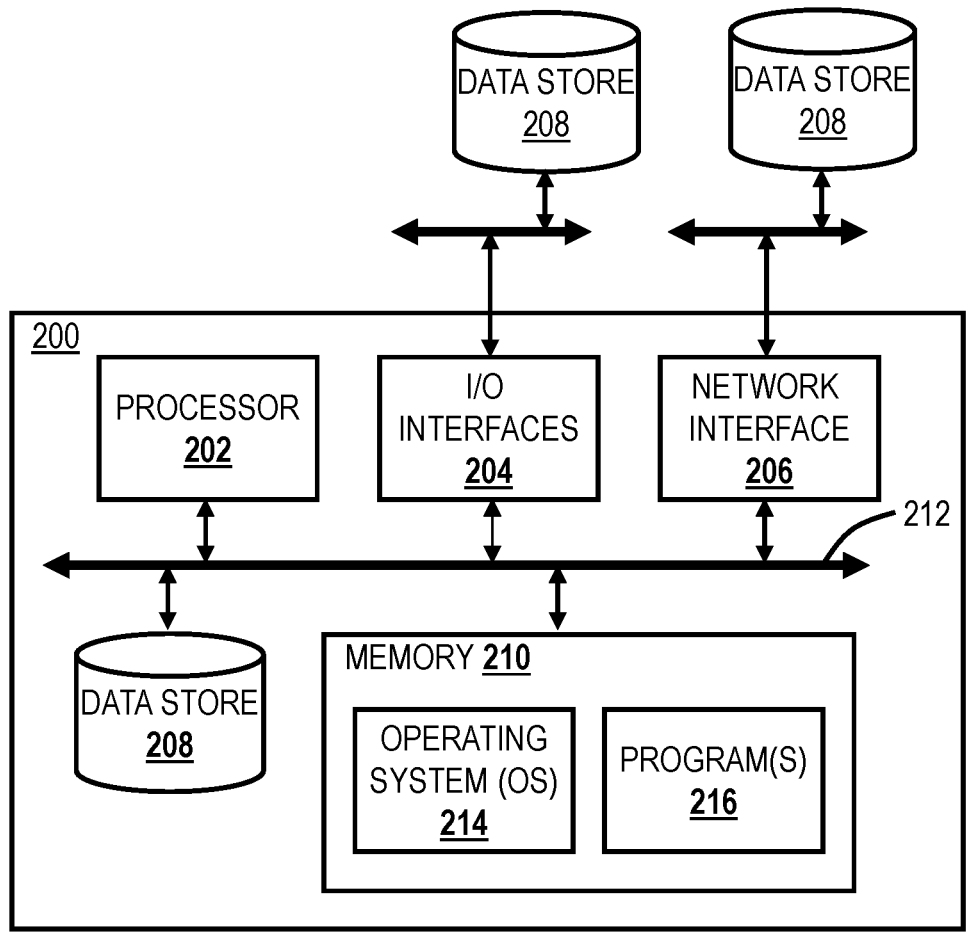
FIG. 7 is a block diagram of a server that may be used in the cloud-based system of FIG. 6 or stand-alone.

FIG. 6 is a network diagram of a cloud-based system 100 for implementing various cloud-based functions and services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 7) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 7 is a block diagram of a server 200, which may be used in the cloud-based system 100 (FIG. 6), in other systems, or stand-alone. For example, the CNs 102 (FIG. 6) and the central authority nodes 106 (FIG. 6) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 6). The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 8:
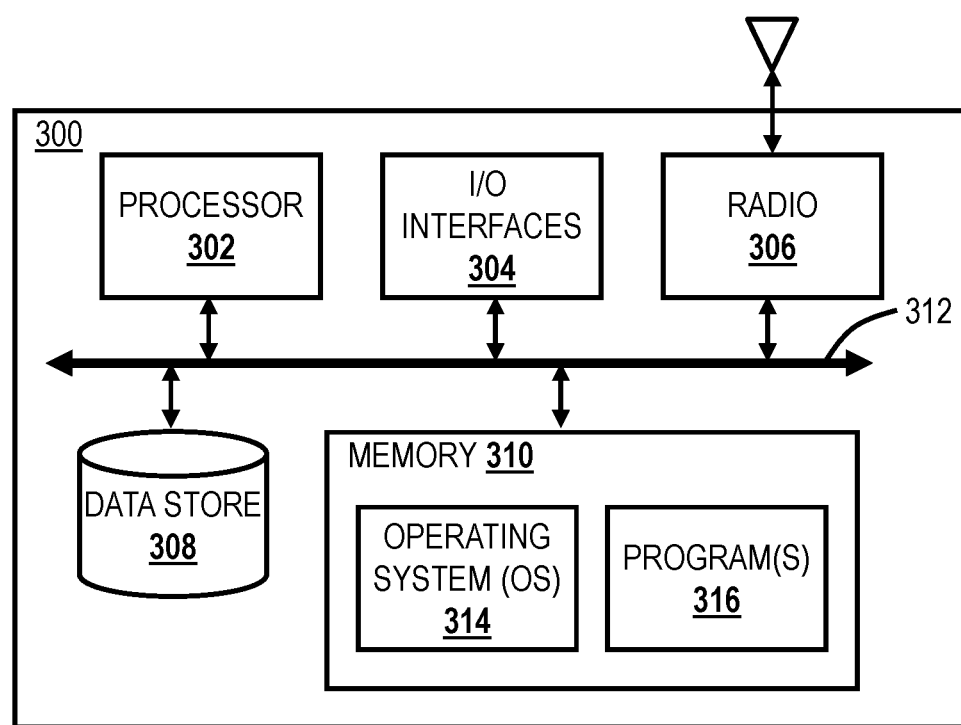
FIG. 8 is a block diagram of a user device that may be used in the cloud-based system of FIG. 6 or stand-alone.

FIG. 8 is a block diagram of a user device 300, which may be used in the cloud-based system 100 (FIG. 6), as part of a network, or stand-alone. Again, the user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 7 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 8, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 6).

Again, the present disclosure provides a method and system for context based navigation system interaction. The navigation system of the present disclosure is configured to receive a short command from a vehicle occupant and extrapolate relevant details associated with the command using an artificial intelligence (AI)/machine learning (ML) algorithm. These relevant details may be obtained from a mobile device associated with the occupant and in communication with the navigation system, an external database in communication with the navigation system, etc. Communication links may be wired, wireless through the cloud, near field, etc. Thus, for example, a command such as "I want to go to work for my afternoon meeting" is processed to identify and retrieve the occupant's workplace and work location address from the occupant's mobile device, check the occupant's calendar on the occupant's mobile device to determine when the afternoon meeting actually is, select a fastest route or route that best fits any stated desired arrival time, and select a best route based on factors such as traffic, remaining fuel/charge, fuel/charging station locations, road conditions, weather, etc.

Further, each occupant's identity may be determined via near field key fob recognition, microphone voice recognition, camera facial recognition, or via the detection of the mobile device associated with the occupant. Thus, for example, a command such as "we want to go to work for our afternoon meeting" is processed to identify and retrieve the occupants' workplace and work location address from the occupants' mobile devices, check the occupants' calendars on the occupants' mobile devices to determine if the afternoon meeting is the same for each of the occupants and when the afternoon meeting actually is, select a fastest route or route that best fits any stated desired arrival time, and select a best route based on factors such as traffic, remaining fuel/charge, fuel/charging station locations, road conditions, weather, etc. Thus, the navigation system utilizes communication links with multiple identified external information sources. Further, the navigation system may query an external map or parking spot database to fine tune the route and locate a parking spot that takes the occupants to an ultimate destination that is as close as possible to their goal. It will be readily apparent to those of ordinary skill in the art that levels of complexity may be added, with multiple occupants being identified and issuing different commands, multiple external information sources subsequently being consulted, and multiple sub-routes to multiple destinations being planned and followed.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method, comprising:
   at a navigation system disposed in a vehicle, receiving a command from an occupant of the vehicle, wherein the command includes an occupant-defined nomenclature associated with a destination;
   using an artificial intelligence (AI)/machine learning (ML) system associated with the navigation system, interpreting the command using occupant-individualized contextual information obtained from a mobile device of the occupant or an external database in communication with the AI/ML system to generate an executable command, wherein the executable command includes a location address associated with the destination, and wherein the occupant-individualized contextual information is obtained from at least one of the mobile device physically separated from each of the navigation system and the AI/ML system or the external database physically separated from each of the navigation system and the AI/ML system;
   at the navigation system, receiving the executable command, generating a corresponding output, and providing the output to the occupant; and
   at an electronic control unit (ECU) disposed in the vehicle, receiving the executable command and operating the vehicle in accordance with the executable command.

2. The method of claim 1, further comprising, identifying the occupant via near field key fob recognition, microphone voice recognition, camera facial recognition, or via detection of the mobile device.

3. The method of claim 1, wherein the command comprises a verbal command or a written command.

4. The method of claim 1, wherein the mobile device of the occupant or the external database is in communication with the AI/ML system via a communication link that is wired, wireless through a cloud network, or near field.

5. The method of claim 1, wherein the command comprises insufficient information for the navigation system to determine a proposed navigation route, the executable command comprises sufficient information for the navigation system to determine the proposed navigation route due to the contextual information, and the output comprises the proposed navigation route provided to the occupant through a user interface display of the navigation system.

6. The method of claim 5, wherein the proposed navigation route is determined further based on at least one of traffic, remaining fuel/charge, fuel/charging station locations, road conditions, weather, and operational state of the vehicle.

7. A non-transitory computer-readable medium comprising instructions stored in a memory and executed by a processor to carry out steps comprising:
   at a navigation system disposed in a vehicle, receiving a command from an occupant of the vehicle, wherein the command includes an occupant-defined nomenclature associated with a destination;
   using an artificial intelligence (AI)/machine learning (ML) system associated with the navigation system, interpreting the command using occupant-individualized contextual information obtained from a mobile device of the occupant or an external database in communication with the AI/ML system to generate an executable command, wherein the executable command includes a location address associated with the destination, and wherein the occupant-individualized contextual information is obtained from at least one of the mobile device physically separated from each of the navigation system and the AI/ML system or the external database physically separated from each of the navigation system and the AI/ML system;
   at the navigation system, receiving the executable command, generating a corresponding output, and providing the output to the occupant; and
   at an electronic control unit (ECU) disposed in the vehicle, receiving the executable command and operating the vehicle in accordance with the executable command.

8. The non-transitory computer-readable medium of claim 7, the steps further comprising, identifying the occupant via near field key fob recognition, microphone voice recognition, camera facial recognition, or via detection of the mobile device.

9. The non-transitory computer-readable medium of claim 7, wherein the command comprises a verbal command or a written command.

10. The non-transitory computer-readable medium of claim 7, wherein the mobile device of the occupant or the external database is in communication with the AI/ML system via a communication link that is wired, wireless through a cloud network, or near field.

11. The non-transitory computer-readable medium of claim 7, wherein the command comprises insufficient information for the navigation system to determine a proposed navigation route, the executable command comprises sufficient information for the navigation system to determine the proposed navigation route due to the contextual information, and the output comprises the proposed navigation route provided to the occupant through a user interface display of the navigation system.

12. The non-transitory computer-readable medium of claim 11, wherein the proposed navigation route is determined further based on at least one of traffic, remaining fuel/charge, fuel/charging station locations, road conditions, weather, and operational state of the vehicle.

13. A system, comprising:
   a navigation system disposed in a vehicle operable for receiving a command from an occupant of the vehicle, wherein the command includes an occupant-defined nomenclature associated with a destination;
   an artificial intelligence (AI)/machine learning (ML) system associated with the navigation system and comprising a non-transitory computer-readable medium comprising instructions stored in a memory and executed by a processor operable for interpreting the command using occupant-individualized contextual information obtained from a mobile device of the occupant or an external database in communication with the AI/ML system to generate an executable command, wherein the executable command includes a location address associated with the destination, and wherein the occupant-individualized contextual information is obtained from at least one of the mobile device physically separated from each of the navigation system and the AI/ML system or the external database physically separated from each of the navigation system and the AI/ML system;

the navigation system operable for receiving the executable command, generating a corresponding output, and providing the output to the occupant; and an electronic control unit (ECU) disposed in the vehicle operable for receiving the executable command and operating the vehicle in accordance with the executable command.

14. The system of claim 13, the AI/ML system further operable for identifying the occupant via near field key fob recognition, microphone voice recognition, camera facial recognition, or via detection of the mobile device.

15. The system of claim 13, wherein the command comprises insufficient information for the navigation system to determine a proposed navigation route, the executable command comprises sufficient information for the navigation system to determine the proposed navigation route due to the contextual information, and the output comprises the proposed navigation route provided to the occupant through a user interface display of the navigation system.

16. The method of claim 1, wherein the occupant-defined nomenclature associated with the destination is, by itself, at least one of insufficient to determine the location address associated with the destination or insufficient for the navigation system to determine a navigation route to the destination.

17. The method of claim 1, wherein the location address associated with the destination is determined utilizing the contextual information obtained from the mobile device of the occupant.

18. The method of claim 1, wherein the command includes an additional, occupant-defined nomenclature associated with an additional destination, wherein the AI/ML system is further utilized to interpret the command using additional, occupant-individualized contextual information obtained from an additional mobile device of an additional occupant in communication with the AI/ML system or the external database to generate the executable command, wherein the additional, occupant-individualized contextual information is obtained from at least one of the additional mobile device physically separated from each of the navigation system and the AI/ML system or the external database physically separated from each of the navigation system and the AI/ML system, and wherein the executable command includes an additional location address associated with the additional destination.

19. The method of claim 1, wherein using the AI/ML system associated with the navigation system, interpreting the command using occupant-individualized contextual information obtained from the mobile device of the occupant or the external database in communication with the AI/ML system to generate the executable command comprises:

utilizing natural language processing, interpreting the command using occupant-individualized contextual information obtained from the mobile device of the occupant or the external database in communication with the AI/ML system to generate the executable command.

20. The method of claim 1, wherein the command is received from multiple occupants of the vehicle including the occupant and includes occupant-defined nomenclature associated with multiple destinations, and wherein the AI/ML system is further utilized to identify which of the multiple occupants issued the command and interpret the command using occupant-individualized contextual information obtained from multiple external information sources in communication with the AI/ML system to generate the executable command, the executable command including multiple sub-routes to multiple location addresses associated with the multiple destinations.

* * * * *